Feb. 4, 1941.　　　L. L. SMALLEY　　　2,230,415
BRAKE TESTING MACHINE ROLLER
Filed July 8, 1938
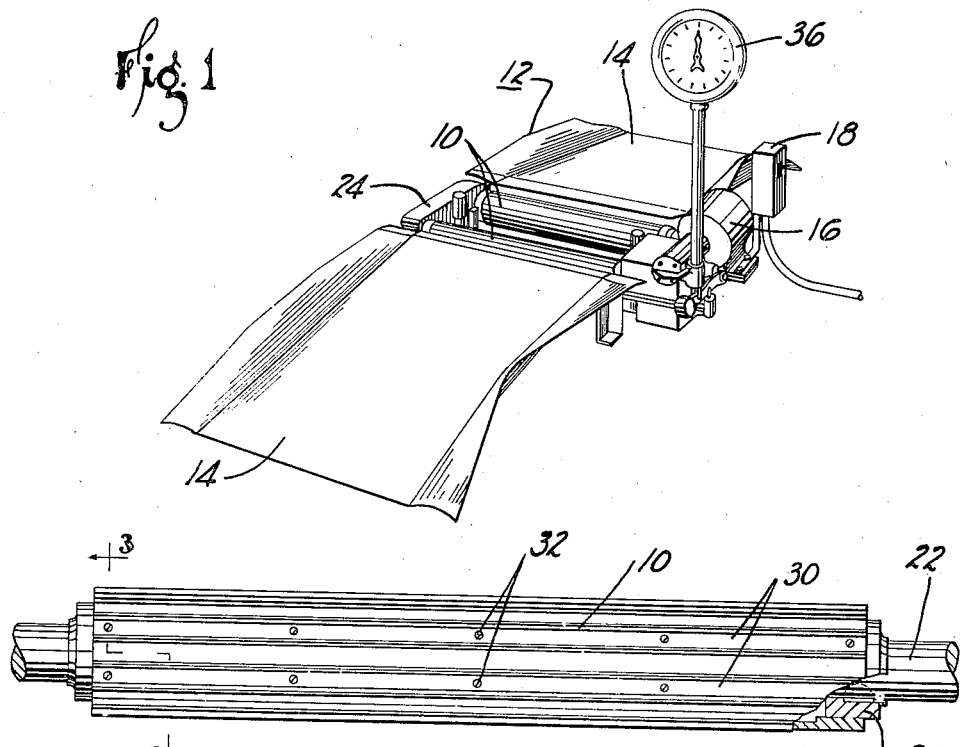
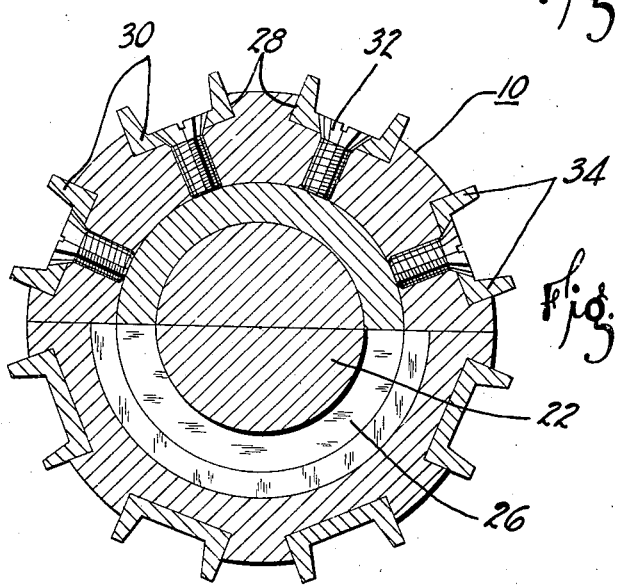
INVENTOR
LEE L. SMALLEY
BY
H. O. Clayton
ATTORNEY Patented Feb. 4, 1941

2,230,415

UNITED STATES PATENT OFFICE 2,230,415

BRAKE TESTING MACHINE ROLLER

Lee L. Smalley, Watertown, Conn., assignor to Bendix Products Corporation, South Bend, Ind., a corporation of Indiana Application July 8, 1938, Serial No. 218,119

3 Claims. (Cl. 74—14)

This invention relates to brake testing machines for vehicles or the like, and more particularly to rollers adapted for use in such machines.

In testing the brakes of a vehicle by brake testing machines wherein the wheels of the vehicle are rotated against the resistance of the brakes associated with the wheels by force applied to the peripheries of the wheels, it is essential for purposes of obtaining an accurate determination of the condition of the brakes that as little friction or slippage exist as possible between the rollers of the machine and the tires of a vehicle contacting the rollers. When the tires of a vehicle are wet, due to snow, slush or rain, they will have a tendency to slip upon the rollers, preventing an accurate recording of the braking effects of the wheel. To overcome this discrepancy, the rollers of the testing machine must be so constructed as to prevent the slippage due to wet tires.

An object of this invention, therefore, is to provide rollers for a brake testing machine so constructed as to avoid slippage of the vehicle wheels resultant of wet tires.

Another object of the invention is to provide rollers for a brake testing machine having their outer faces so formed as to squeeze the water from the tires as the latter contact the faces of the rollers.

A further object of the invention is to provide a simple, economical and practical roller having peripheral equi-distant longitudinal slots for the reception of hardened inserts so as to withstand heavy duty work and at the same time avoid slippage of the wheels of the vehicle due to wet tires.

Other objects and desirable particular constructions and arrangements of parts will become apparent upon reference to the following detailed description of an embodiment of the invention shown in the accompanying drawing, in which:

Figure 1 is a pictorial representation of a brake testing machine for testing one wheel of a vehicle embodying my invention;

Figure 2 is a side elevational view of a preferred form of my invention; and

Figure 3 is a section taken substantially on line 3—3 of Figure 2.

Referring to the drawing for a more detailed description of the invention, spaced rollers 10 are shown embodied in a brake testing machine 12 for testing a brake associated with one wheel of a vehicle. The machine comprises ramps 14 leading to the rollers 10, actuated by a motor 16 controlled by a switch 18. It is, of course, to be understood that the use of the invention is not limited to this type of machine alone, nor to brake testing machines, but it is adapted for use in any device requiring a high degree of traction or grippage.

Since the operation and function of these machines are well known to those versed in the art, a detailed description of the former will not be reiterated but only so much as is necessary for the better understanding of the action and function of the rollers.

The motor 16 drives the shaft 22 of one of the rollers 10, and this rotation is imparted to the shaft of another roller 10 by means of suitable gearing enclosed in a housing 24. Keyed to the shafts 22 adjacent the ends thereof are hubs 26 having suitably secured thereto the body of the rollers 10.

In the preferred embodiment of my invention, I provide the rollers 10 about their outer peripheries with equidistant longitudinal slots 28 adapted to receive channeled steel inserts 30, held rigidly within the slots by suitable means, such as studs or screws 32. The inserts have outwardly extending blunt edge flanges 34 for frictionally gripping the tread on the tire of a wheel the brake of which is to undergo a test. The slots 28 in the outer peripheries of the rollers are such that after the insertion of the hardened inserts 30 the radial distance from the center of the shaft 22 to the peripheries of the rollers exceeds that to the body of the inserts. The rollers are such, therefore, as to provide an irregular path about their peripheries and also to have the flanges 34 extending therefrom.

In brake testing machines slippage of the wheels upon the rollers render an inaccurate result as to the braking effect of the wheel, and since little variation in the braking of the wheels results in loss of control of the vehicle upon application of the brakes, the test should be as accurate as possible. It is obvious then that the rollers of a testing machine render an important function in brake testing. When the tires on the wheels of a vehicle are wet, due to snow, rain, or slush, the tires have a tendency to slip upon the rollers. Consequently, grippage or traction by the rollers is a highly desirable characteristic in obtaining accurate results in the testing.

The outwardly extending flanges 34 engage the tire, and when the latter is wet the water film about the tire is cut by the flanges and a gripping function results, preventing slippage of the wheel. The irregular radial distances to the outer peripheries of the rollers add to gripping the tire in that as a portion of the water film about the tire falls off at each flange as the water is pressed from the tire. The rollers in so acting squeeze the water from the tire, grip the same against slipping, and permit an accurate test of the braking effect of that particular wheel the braking effect being indicated on a gauge 36.

It will be apparent from the above detailed description that I have provided a wheel supporting roller for a brake testing machine having means thereon arranged so as to cut a film of water about a wet tire supported on the wheel so as to grip the tire and thus inhibit slippage of the wheel thus rendering a more accurate recording as to the braking effect of the wheel.

While one illustrative embodiment has been described in detail, it is not my intention to limit the scope of the invention to the particular embodiment or otherwise than by the terms of the appended claims.

I claim:

1. In a brake testing apparatus of the class described, a roller comprising a hollow cylindrical body having in its periphery equi-distant longitudinal slots, a channeled insert in each slot, side marginal flanges extended beyond the periphery of the body, a hub sleeved in each end of the body, and means for securing the assembly together.

2. In a brake apparatus of the class described, a roller comprising a hollow cylindrical body having in its periphery equi-distant longitudinal slots, inserts in the slots having faces inside of the radius of the body, side marginal flanges on the inserts having blunt edges extended beyond the periphery of the body, hubs in the ends of the body, and means for securing the inserts in the channels and the hubs in the ends of the body.

3. In a brake testing apparatus of the class described, a roller comprising a hollow cylindrical body having spaced longitudinal peripheral slots extended the overall length thereof, a channeled insert in each slot extended throughout the length of the slot, a hub fitted in each end of the body, and means common to the body, inserts and hubs for securing the assembly together.

LEE L. SMALLEY.